(12) United States Patent
Hiemeyer et al.

(10) Patent No.: US 8,822,005 B2
(45) Date of Patent: Sep. 2, 2014

(54) VACUUM INSULATION BOARD AND METHOD FOR PRODUCING THE SAME

(75) Inventors: Jochen Hiemeyer, Würzburg (DE); Stefan Roth, Margetshöchheim (DE)

(73) Assignee: va-Q-tec AG, Würzburg (DE)

( * ) Notice: Subject to any disclaimer, the term of this patent is extended or adjusted under 35 U.S.C. 154(b) by 816 days.

(21) Appl. No.: 12/736,760

(22) PCT Filed: May 6, 2009

(86) PCT No.: PCT/EP2009/003246
§ 371 (c)(1),
(2), (4) Date: Jan. 31, 2011

(87) PCT Pub. No.: WO2009/135666
PCT Pub. Date: Nov. 12, 2009

(65) Prior Publication Data
US 2011/0117308 A1      May 19, 2011

(30) Foreign Application Priority Data

May 6, 2008   (DE) .......................... 10 2008 022 380

(51) Int. Cl.
| B32B 3/02 | (2006.01) |
| E04B 1/80 | (2006.01) |
| B32B 1/06 | (2006.01) |
| B29C 65/00 | (2006.01) |

(52) U.S. Cl.
USPC ........................... 428/69; 220/592.27; 428/68

(58) Field of Classification Search
USPC .................................. 428/69, 68; 220/592.27
See application file for complete search history.

(56) References Cited

U.S. PATENT DOCUMENTS

| 5,236,758 | A |   | 8/1993 | Sextl et al. |       |
| 5,532,034 | A | * | 7/1996 | Kirby et al. | ..................... 428/69 |
| 5,928,463 | A |   | 7/1999 | Michaelis |       |
| 6,623,413 | B1 |  | 9/2003 | Wynne |       |

FOREIGN PATENT DOCUMENTS

| DE | 101 14 633 | 9/2002 |
| DE | 100 58 566 | 10/2002 |
| WO | WO-2007/033836 | 3/2007 |

* cited by examiner

*Primary Examiner* — Brent O'Hern
(74) *Attorney, Agent, or Firm* — Pandiscio & Pandiscio

(57) ABSTRACT

A vacuum insulated panel comprises a filler and a vacuum-tight high-barrier film envelope, with an air-permeable sheet element that serves as a filter material for dust, wherein the sheet element consists of the same material as the sealing layer of the high-barrier film enveloping the vacuum insulated panel and passes through the sealing seams of the high-barrier film, and to a method for producing such a vacuum insulated panel, wherein the sheet element, in the form of a strip preferably folded along a central axis, is placed between two sealing films and is thermally adhesively bonded to the inwardly disposed sealing layers of the sealing films such that a joint is formed between the two sealing films which are sealed together by means of a respective seam on each of perpendicular sides, the strip-shaped sheet element being co-sealed into the seams.

9 Claims, 1 Drawing Sheet

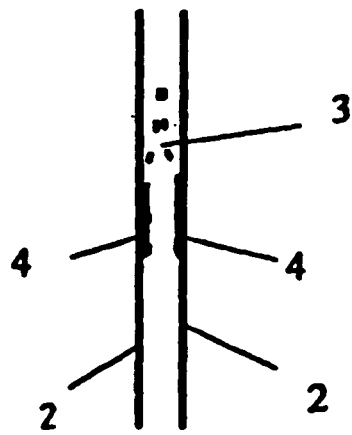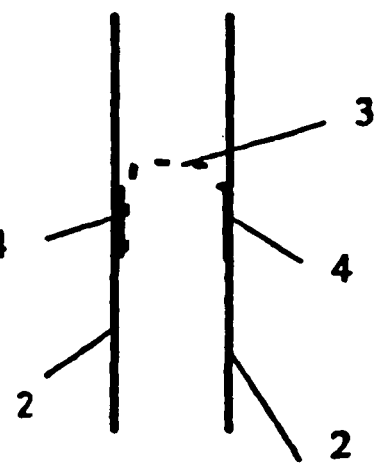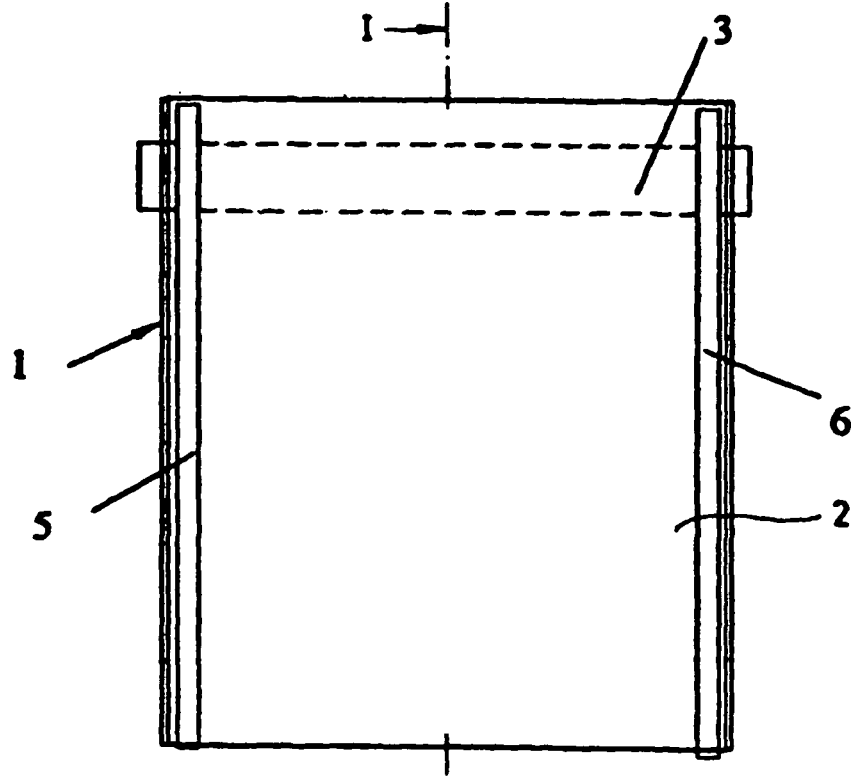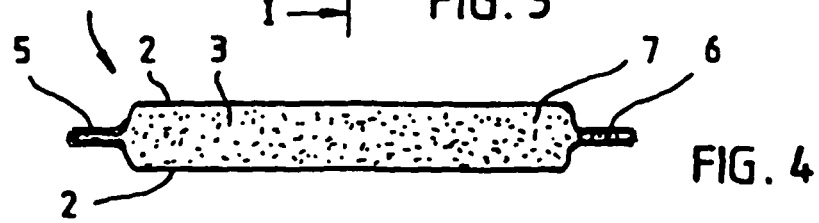

VACUUM INSULATION BOARD AND METHOD FOR PRODUCING THE SAME

CROSS-REFERENCE TO RELATED APPLICATIONS

This patent application is a U.S. National Stage entry of International (PCT) Patent Application No. PCT/EP2009/003246, filed May 6, 2009 by Jochen Hiemeyer et al. for VACUUM INSULATION BOARD AND METHOD FOR PRODUCING THE SAME, which in turn claims benefit of German Patent Application No. 10 2008 022 380.8 filed May 6, 2008.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

SEQUENCE LISTING

Not Applicable.

STATEMENT REGARDING PRIOR DISCLOSURES BY THE INVENTOR OR A JOINT INVENTOR

Not Applicable.

BACKGROUND OF THE INVENTION

1. Field of the Invention

The invention is directed to a vacuum insulated panel comprised of a filler and a vacuum-tight high-barrier film envelope with an air-permeable sheet element that serves as a filter material for dust, particularly for the dust-tight sealing of an evacuation opening, and to a method for producing such a vacuum insulated panel.

2. Description of the Prior Art

Evacuated insulation panels consist of a high-thermal-conductivity, open-pored core that is able to withstand compressive loads, and a completely closed, plastic film envelope having a high barrier effect against gases and water vapor. The core is evacuated at a gas pressure of between 0.01 mbar and 5 mbar. This reduces the thermal conductivity of the residual gases in the porous core to a minimum. Depending on the core material, the thermal conductivity in the evacuated state can be between 0.0015 and 0.010 W/mK. Commonly used core materials are powder, open-pore foam, glass fibers or aerogels. Foams, glass fibers or powder usually come in board form and are cut to the desired size, wrapped in high-barrier film and pumped free of air in a vacuum chamber.

In evacuating powdered core materials, care must be taken that no powder dust finds its way out of the pouch to be evacuated and into the vacuum chamber. In German Patent Specification DE 100 58 566, for example, it is recommended to use non-woven polyester to wrap a core panel made of pyrogenic silicic acid pressed into board form. This prevents powder dust from the inside from contaminating the sealing seam of the film pouch at the outlet opening during evacuation. Contamination with minute particles of powder can substantially degrade the barrier effect of the sealing seam placed at the opening of the film pouch after the completion of the evacuation process, and can completely destroy the leak-tightness of the vacuum insulated panel and let air in. A disadvantage of this method is that the non-woven polyester has to be folded elaborately so that it fits the core snugly even at the edges of the panel. The sealing seam of the high-barrier film is preferably sealed near the edges of the core panel to avoid producing any unnecessarily long, protruding flaps on the sides. If, on the other hand, portions of the non-woven envelope fabric deviate from the edge, there is a risk that this fabric will be co-sealed into the seam, thus, under normal circumstances, causing the seam to leak at the points concerned.

An air-permeable woven or non-woven fabric can also be used in another production variant. Here, a pouch is first made from the air-permeable sheet element, powder is fed in, the pouch is sealed, and the structure is pressed into board form. This board is then wrapped in barrier film or slid into a pouch made of high-barrier film. Here again, there is a risk that, in the presence of close-fitting sealing seams, some non-woven or woven material will get into the seam and cause a leak.

In a further production variant, which is known from DE 10 2005 045 726, a pouch is first formed from high barrier film by suitable cutting and welding, and a powder from which the core will subsequently be molded is fed directly into this pre-formed pouch made of high-barrier film. A trough-shaped filter felt is glued into the opening of this pre-formed pouch. This keeps the powder in the pouch during evacuation in the vacuum chamber, and prevents the film seams and the chamber from being contaminated. Another option is to take a pouch that is closed on two opposite sides and seal the bottom, third side with filter felt before filling the pouch. Filling then takes place through the remaining opening on the fourth side, which is sealed with another sealing seam after filling is completed. Evacuation is then performed through the side sealed with the filter felt. However, applying the polyester felt to the inside of the pouch in a manner that ensures powder-tightness at all points is a relatively elaborate operation in both versions. Since the shape of the pouch is already fixed before the filter felt is inserted, the sealing seams of the high-barrier film that are adjacent the remaining opening in the pouch have already been made, and the filter felt cannot inadvertently get into these seams, which would render the system non-leaktight, since any sealed-in filter felt will seriously disrupt the tightness of a given sealing seam. Due to the existing shape of the pouch, a high-edged, trough-shaped structure must be used as the filter felt, which, first of all, is elaborate to make, and must be glued to the flat and sides of the high-barrier pouch by the sealing layer provided inside the latter. The gluing of the polyester felt to the inner sealing layer of the pouch is usually done by thermal fusion. However, this does not produce any sealing seams that can be accessed from the outside, as when the pouch is sealed, but only inner welds that cannot be designated as sealing seams in the sense of the invention because they do not join the two inwardly disposed sealing surfaces of two high-barrier film regions directly to each other, but instead each join only a single region of the high-barrier film to a trough-shaped, pre-formed filter felt. Even during the final sealing of the still air-permeable region of the pouch opening by a last sealing seam, no portion of the filter felt must get into this sealing seam of the barrier pouch, since the pouch would then immediately lose its leaktightness. Production of this kind would thus require high expenditure and extreme care in order to avoid an increased number of rejects.

From the disadvantages of the described prior art comes the problem initiating the invention, that of improving a vacuum insulated panel of the aforesaid species so that contamination of the sealing surface(s) with inadvertently entrained powder or dust particles during evacuation can be reliably prevented with minimal expenditure.

BRIEF SUMMARY OF THE INVENTION

This problem is solved by the fact that the sheet element consists of the same material as the sealing layer of the high-barrier film enveloping the vacuum insulated panel, and passes through, particularly all the way through, two, a plurality or all of the sealing seams of the high-barrier film, particularly two high-barrier-film regions that would otherwise be sealed directly to each other by the respective sealing seam, i.e., sealing seams of the kind which, on the finished vacuum insulated panel, are accessible at the margins from the outside over their entire length, and which therefore serve to seal the vacuum inside the vacuum insulated panel and thus must not be disrupted under any circumstances.

Such an arrangement greatly simplifies the elaborate process of fastening the sheet element, since in such cases the sheet element no longer has to be trough-shaped in order for it to be sealed all the way around. It is sufficient if the sheet element is fastened along two opposite edges or boundary lines, while on the other two edges the sealing is effected by the sealing seams that are passed through at those locations. The sheet element thus need be folded only once, at the most, or not at all.

Surprisingly, the material of a sealing layer can also be used to make an air-permeable sheet element of adequate mechanical strength, one or more plies of which protrude into the sealing seam or even pass through it, and can be glued to it, without comprising leaktightness. Such a sheet element may and should actually pass all the way through the sealing seam without compromising the barrier effect of the envelope after sealing. As a result of the heat- and pressure-activated sealing process, the sheet element, in contrast to other non-woven materials, fuses completely with the material of the sealing layer and forms a uniform and impervious mass. No air bubbles or other detrimental structures form, as they do when a non-woven made of a different material is co-sealed into the sealing seam and causes it to leak.

An arrangement according to the invention comprising a sheet element between two high-barrier films can be further improved by gluing the sheet element to the high-barrier film envelope at the margins in such a way that the high-barrier film envelope forms with the sheet element a pouch having an air-permeable but powder-tight opening, and by filling this pouch with a powder serving as the insulating core, the sheet element being arranged so that it passes through the continuous circumferential sealing seams of the vacuum-tight envelope film and is fused to the sealing material of the high-barrier film envelope.

It has proven advantageous for both the sealing layers of the high-barrier films and the sheet element to consist of non-woven or woven polyethylene fabric.

It is within the scope of the invention that both the sealing layers of the high-barrier films and the sheet element consist of non-woven or woven polypropylene fabric.

A method for producing a vacuum insulated panel according to the invention is characterized by the steps of placing the sheet element, in the form of a strip preferably folded along the central axis, between two sealing films, thermally adhesive bonding the sheet element to the inwardly disposed sealing layers of the sealing films so that a joint is formed between the two sealing films, and finally, to seal the two sealing films together by means of a respective seam on each of the perpendicular sides, the strip-shaped sheet element being co-sealed into these seams.

BRIEF DESCRIPTION OF THE SEVERAL VIEWS OF THE DRAWINGS

Further features, details, advantages and effects based on the invention will emerge from the following description of a preferred embodiment of the invention and by reference to the drawing. Therein:

FIG. 1 is a section through a high-barrier film envelope in the yet-unfilled state, roughly corresponding to a section through FIG. 3 along line I-I;

FIG. 2 is a view corresponding to FIG. 1 of the high-barrier film envelope in a state immediately preceding the infeeding of the powder;

FIG. 3 is a side view of the high-barrier film envelope from FIGS. 1 and 2; and FIG. 4 is a plan view of an end face from FIG. 3 in the direction of arrow IV.

DETAILED DESCRIPTION OF THE INVENTION

The drawing represents a specific embodiment of a vacuum insulated panel 1 formed from two blanks 2 of high-barrier, preferably metalized, film. So that these two high-barrier films 2 can be welded together airtight along their edges, each is provided, on the side facing the other, with a sealing layer of polyethylene. For the evacuation process, the vacuum insulated panel 1 according to the invention is rendered dust-tight at the ends by an air-permeable sheet element 3; this sheet element 3 is fabricated from the same material as the sealing layer of the high-barrier films 2, in this case, polyethylene. This can be a non-woven fabric, a woven fabric, or any other textile structure that has a flat shape, is air-permeable and at the same time is sufficiently mechanical stable.

A strip-shaped sheet element 3 is cut from such a material such that it is slightly longer than the opening that is to be sealed dust-tight, i.e., the opening of a pouch formed from the high-barrier film, particularly from the two sheets 2.

As FIG. 1 shows, the sheet element 3 cut into a strip shape is folded along a line that extends, preferably centrally, approximately parallel to its longitudinal axis, and is then, in the folded state, placed between the sealing layers of the two high-barrier films 2 with its fold line preferably toward the near edge of the high-barrier film blanks 2.

Both halves of the strip are then fastened, preferably thermally, i.e. under the effect of elevated temperature, each by a portion of its area, to the respective adjacent sealing layer, specifically in such a way that when the two high-barrier films 2 are pulled apart—as depicted in FIG. 2—a powder-tight seal is formed. Continuous, linear adhesive bonding 4 to each half of the strip-shaped sheet element 3 has proven effective.

In a next, following step, illustrated in FIG. 3, the two film sections 2 are then thermally welded, by means of a sealing tool, along the two edges extending perpendicular to the longitudinal axis or fold line of the strip-shaped sheet element 3, forming respective sealing seams 5, 6, which are specifically a distance apart that is smaller than the length of the strip-shaped sheet element 3 fastened to both films 2, in such a way that this sheet element 3 passes through both sealing seams 5, 6 and is co-sealed into them as they are made. Thus, no gaps whatsoever remain between the dust-tight sheet element 3 and the two adjacent sealing seams 5, 6, resulting in a pouch made from the two film sections 2 that is now sealed at least dust-tight on three sides.

Next, this pouch made from high-barrier film 2 can be filled from its fourth, still completely open side with a dust-form or free-flowing powder 7.

This having been done, the fourth side of the pouch of high-barrier film 2 is also sealed airtight, preferably by means of a sealing device, particularly by forming another sealing seam that preferably intersects the two oppositely disposed sealing seams 5, 6 and thus closes any gaps in this region of the pouch.

In a next step, the pouch of high-barrier film 2, filled with enough powder 7 to form the core, is brought into the desired shape, preferably a flat board shape, optionally by means of a press.

The sealed pouch of high-barrier film 2 is placed in a vacuum chamber. As this chamber is evacuated, the air is able to escape from the pouch along the opening sealed by the dust-tight, but air-permeable, sheet element 3. Once a predetermined degree of vacuum has been reached, the initially air-permeable opening in the region of the sheet element 3 is sealed airtight, preferably by means of a sealing tool, particularly by another sealing seam extending approximately parallel to the longitudinal axis of the strip-shaped sheet element 3. Although this final sealing seam is preferably located to one side of the sheet element 3, particularly outside of it, under some circumstances it could actually extend immediately adjacent or on past it, since if the sheet element 3—in contrast to the non-wovens used heretofore—is sealed in, this will not compromise the leaktightness of the vacuum insulated panel 1.

The finished vacuum insulated panel 1 thus remains durably vacuum-tight even after being removed from the vacuum chamber. Studies of the increase in gas pressure show that the vacuum insulated panel 1 produced in this way is just as vacuum-tight as a conventionally produced vacuum insulated panel, despite the sheet element 3 overlapping with the sealing seams 5, 6 in some locations. Yet the production expenditure for the vacuum insulated panel 1 is considerably reduced by the invention.

In a preferred embodiment, the finished vacuum insulated panel 1 has four sealing seams 5, 6 that preferably all extend along end faces of the vacuum insulated panel 1 and intersect with each other in the corner regions.

The high-barrier film(s) 2 serving as the vacuum-tight seal also preferably consist(s) of a soft, flexible, unshaped material, such that before the shaping step, performed by means of a press or the like, it is possible to create an unshaped pouch with a large opening, thus greatly facilitating the filling process. In particular, the (two) high-barrier film(s) 2 consist(s) of a sheet element that can be completely flattened out without stress or forcing.

A further particularity is that each of the linear joints 4 between the sheet element 3 and the sealing layer of a respective high-barrier film 2 intersects, particularly at an angle of 45° or more, particularly at approximately right angles, with a respective one of the two adjacent sealing seams 5, 6 which, generally speaking, join the two sheets 2 of high-barrier film directly to each other.

It is also possible within the scope of the invention, instead of fabricating the core by feeding in a powdered material, to use a powdered core and to envelop it, on the inner faces of the high-barrier film(s), in a sheet element 3 that is made from the same material as the sealing layer and in this case would not have to be strip-shaped, but could instead have a more areal form. In this case there would be no need for any precautions to ensure that the sheet element 3 always conforms snugly to the core, since in the worst case it would merely be co-sealed into any welding seams without causing them to leak.

The invention claimed is:

1. A vacuum insulated panel comprising a filler and a vacuum-tight barrier film envelope with an air permeable sheet element that serves as a filter material for dust, particularly for dust-tight sealing of an evacuation opening, wherein said sheet element
    (a) is fabricated with the same material as a sealing layer of said vacuum-tight barrier film enveloping the vacuum insulated panel in the form of a woven fabric or non-woven fabric, and
    (b) passes through at least two sealing seams whereby each of the at least two sealing seams joins the sealing layers of two sections of said vacuum-tight barrier film together.

2. The vacuum insulated panel in accordance with claim 1, wherein said sheet element passes through at least two of the sealing seams of said vacuum-tight barrier film, the sealing seams extending along margins of the vacuum insulated panel to seal the panel, and are fused together with the sealing layer of said vacuum-tight barrier film envelope.

3. The vacuum insulated panel in accordance with claim 2, wherein said sheet element passes through at least two sealing seams of the vacuum-tight barrier film, the sealing seams extending along oppositely disposed, parallel boundary edges of the vacuum insulated panel.

4. The vacuum insulated panel in accordance with claim 1, wherein said sheet element is joined along at least two linear edges to said vacuum-tight barrier film envelope, and said vacuum-tight barrier film envelope, together with said sheet element, forms a pouch.

5. The vacuum insulated panel in accordance with claim 4, wherein said sheet element is joined to said vacuum-tight barrier film envelope along at least two linear joints extending generally parallel to each other.

6. The vacuum insulated panel in accordance with claim 5, wherein each of said linear joints between said sheet element and the sealing layer of a respective vacuum tight barrier film intersect at an angle of more than 45°, with one of the two adjacent sealing seams joining two sheets of said vacuum tight barrier film directly to each other.

7. The vacuum insulated panel in accordance with claim 1, wherein a pouch formed of said vacuum tight barrier film and said sheet element is filled with a powder serving as an insulating core.

8. The vacuum insulated panel in accordance with claim 1, wherein both sealing layers of said vacuum tight barrier film and said sheet element consist of a selected one of non-woven and woven polyethylene fabric.

9. The vacuum insulated panel in accordance with claim 5, wherein both the sealing layers of said vacuum tight barrier film and said sheet element consist of non-woven or woven polypropylene fabric.

* * * * *